(12) United States Patent
Sugawara et al.

(10) Patent No.: US 12,549,633 B2
(45) Date of Patent: Feb. 10, 2026

(54) PHYSIOLOGICAL INFORMATION PROCESSING APPARATUS, PHYSIOLOGICAL INFORMATION SENSOR AND PHYSIOLOGICAL INFORMATION SYSTEM

(71) Applicant: NIHON KOHDEN CORPORATION, Tokyo (JP)

(72) Inventors: Hironori Sugawara, Tokorozawa (JP); Yukio Koyama, Tokorozawa (JP); Hiroshi Kubo, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 1018 days.

(21) Appl. No.: 16/703,189

(22) Filed: Dec. 4, 2019

(65) Prior Publication Data

US 2020/0195724 A1 Jun. 18, 2020

(30) Foreign Application Priority Data

Dec. 14, 2018 (JP) .................................. 2018-234428

(51) Int. Cl.
*A61B 5/00* (2006.01)
*G16H 40/67* (2018.01)
*H04L 67/12* (2022.01)

(52) U.S. Cl.
CPC ............ *H04L 67/12* (2013.01); *A61B 5/0024* (2013.01); *G16H 40/67* (2018.01)

(58) Field of Classification Search
CPC ....... H04L 67/12; A61B 5/0024; G16H 40/67; G16H 40/63

(Continued)

(56) References Cited

U.S. PATENT DOCUMENTS

2008/0188230 A1* 8/2008 Jeon ...................... H04W 72/10
                                                         455/450
2009/0088605 A1* 4/2009 Ross ...................... G16H 40/67
                                                         370/312
(Continued)

FOREIGN PATENT DOCUMENTS

CN          1885747 A      12/2006
JP       2008-54798 A       3/2008
(Continued)

OTHER PUBLICATIONS

Office Action issued Oct. 4, 2022, issued by the Japan Patent Office in counterpart Japanese Patent Application No. 2018-234428.

(Continued)

*Primary Examiner* — John R Downey
(74) *Attorney, Agent, or Firm* — Sughrue Mion, PLLC

(57) ABSTRACT

A physiological information processing apparatus is to be communicatively connected to a plurality of physiological information sensors each of which is configured to acquire physiological information data of a subject being tested. The physiological information processing apparatus is configured to: receive first physiological information data from a first physiological information sensor of the plurality of physiological information sensors, in an $x^{th}$ first subframe (x: natural number) of a plurality of first subframes divided from an nth main frame (n: natural number); and receive the first physiological information data from the first physiological information sensor, in an $x^{th}$ second subframe of a plurality of second subframes divided from an $m^{th}$ main frame (m: natural number).

16 Claims, 14 Drawing Sheets

(58) Field of Classification Search
USPC .................................................. 600/300, 301
See application file for complete search history.

(56) References Cited

U.S. PATENT DOCUMENTS

| | | |
|---|---|---|
| 2012/0089369 A1 | 4/2012 | Abuzeni et al. |
| 2014/0355502 A1* | 12/2014 | Xhafa ................... H04L 5/0053 370/311 |
| 2015/0178964 A1 | 6/2015 | Mato et al. |
| 2015/0238082 A1* | 8/2015 | Soro ........................ H04B 1/00 600/300 |
| 2016/0014690 A1* | 1/2016 | Xhafa ................... H04L 5/0053 370/311 |
| 2017/0055205 A1* | 2/2017 | Morris .................... H04L 67/12 |
| 2017/0155427 A1* | 6/2017 | Hasan ..................... H04W 4/80 |
| 2018/0167266 A1* | 6/2018 | Subramani ........... A61B 5/0024 |
| 2019/0132839 A1* | 5/2019 | Li ......................... H04W 12/08 |

FOREIGN PATENT DOCUMENTS

| JP | 2012-53792 A | 3/2012 |
|---|---|---|
| JP | 2015-119741 | 7/2015 |

OTHER PUBLICATIONS

Office Action issued Apr. 4, 2023 by the Japan Patent Office in counterpart Japanese Patent Application No. 2018-234428.

* cited by examiner

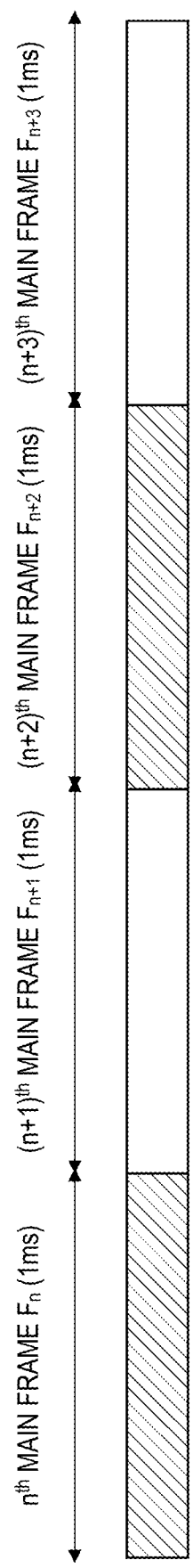

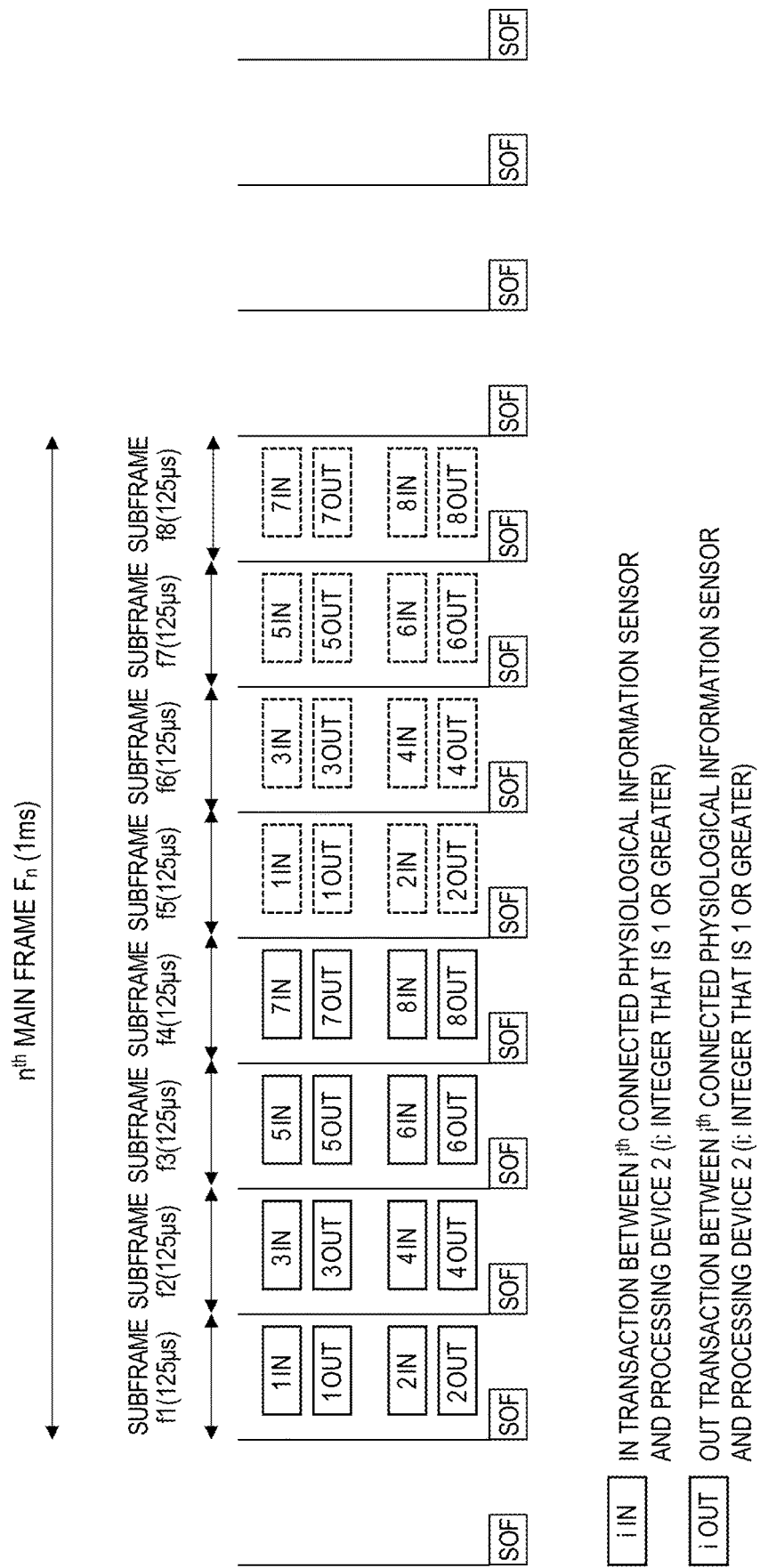

CONFIGURATION OF TRANSACTION

CONFIGURATION OF TOKEN PACKET

CONFIGURATION OF DATA PACKET

CONFIGURATION OF HANDSHAKE PACKET

PHYSIOLOGICAL INFORMATION PROCESSING APPARATUS, PHYSIOLOGICAL INFORMATION SENSOR AND PHYSIOLOGICAL INFORMATION SYSTEM

CROSS-REFERENCE TO RELATED APPLICATIONS

This application is based upon and claims the benefit of priority from prior Japanese patent application No. 2018-234428, filed on Dec. 14, 2018, the entire contents of which are incorporated herein by reference.

TECHNICAL FIELD

The present disclosure relates to a physiological information processing apparatus, a physiological information sensor and a patient system.

BACKGROUND ART

JP-A-2015-119741 discloses a system including a physiological information sensor and a patient display device communicatively connected to the physiological information sensor. In the system disclosed in JP-A-2015-119741, a vital sign acquired by the physiological information sensor is transmitted to the patient display device, as an analog signal. Then, the transmitted vital sign is converted into a digital signal by an AD converter of the patient display device, and the vital sign is subjected to digital signal processing (DSP).

When communicatively connecting a plurality of physiological information sensors to a physiological information processing apparatus (for example, a patient monitor), there are considerable needs for unifying communication interfaces for interconnecting the physiological information processing apparatus and the respective physiological information sensors. Also, there are considerable needs for securing a degree of layout freedom of each physiological information sensor as the number of the physiological information sensors to be mounted to a subject being tested increases.

In this respect, it is considered to interconnect the physiological information processing apparatus and each physiological information sensor by using a communication interface (for example, a USB interface) for transmitting digital data. In this respect, in a case in which each of the physiological information sensors transmits the physiological information data to the physiological information processing apparatus, as digital data (particularly, data packet), there are rooms for further improvement on the patient system, from standpoints of maintaining periodic processing for the physiological information data and executing the processing in real time by the physiological information processing apparatus.

An object of the present disclosure is to provide a physiological information processing apparatus, a physiological information sensor and a patient system capable of improving real time processing for physiological information data transmitted from each of physiological information sensors while maintaining periodicity of the processing for the physiological information data.

SUMMARY

A physiological information processing apparatus related to a first aspect is to be communicatively connected to a plurality of physiological information sensors each of which being configured to acquire physiological information data of a subject being tested. The physiological information processing apparatus is configured to: receive first physiological information data from a first physiological information sensor of the plurality of physiological information sensors, in an $x^{th}$ first subframe (x: natural number) of a plurality of first subframes divided from an nth main frame (n: natural number); and receive the first physiological information data from the first physiological information sensor, in an $x^{th}$ second subframe of a plurality of second subframes divided from an $m^{th}$ main frame (m: natural number).

A patient system related to a second aspect includes: the aforementioned physiological information processing apparatus; and a plurality of physiological information sensors each of which is configured to acquire physiological information data of a subject being tested and is communicatively connected to the physiological information processing apparatus.

A physiological information sensor related to a third aspect is configured to acquire physiological information data of a subject being tested and to be communicatively connected to a physiological information processing apparatus. The physiological information sensor being configured to: transmit physiological information data to the physiological information processing apparatus, in an $x^{th}$ first subframe (x: natural number) of a plurality of first subframes divided from an nth main frame (n: natural number); and transmit the physiological information data to the physiological information processing apparatus, in an $x^{th}$ second subframe of a plurality of second subframes divided from an $m^{th}$ main frame (m: natural number).

A physiological information processing apparatus related to a fourth aspect is to be communicatively connected to a plurality of physiological information sensors each of which being configured to acquire physiological information data of a subject being tested. The physiological information processing apparatus is configured to: receive first physiological information data from a first physiological information sensor of the plurality of physiological information sensors, in an $x^{th}$ first subframe (x: natural number) of a plurality of first subframes divided from an nth main frame (n: natural number), and receive the first physiological information data from the first physiological information sensor, in a $y^{th}$ second subframe of a plurality of second subframes divided from an $m^{th}$ main frame (m: natural number). y is determined based on x.

According to the present disclosure, it is possible to provide the physiological information processing apparatus, the physiological information sensor and the patient system capable of improving real time processing for the physiological information data transmitted from each of the physiological information sensors while maintaining periodicity of the processing for the physiological information data.

BRIEF DESCRIPTION OF DRAWINGS

FIG. 4 illustrates an $n^{th}$ main frame to a $(n+3)^{th}$ main frame;

FIG. 5 illustrates a plurality of subframes included in the $n^{th}$ main frame and transactions that are to be executed in each of the subframes;

DESCRIPTION OF EMBODIMENTS

Figure 1:
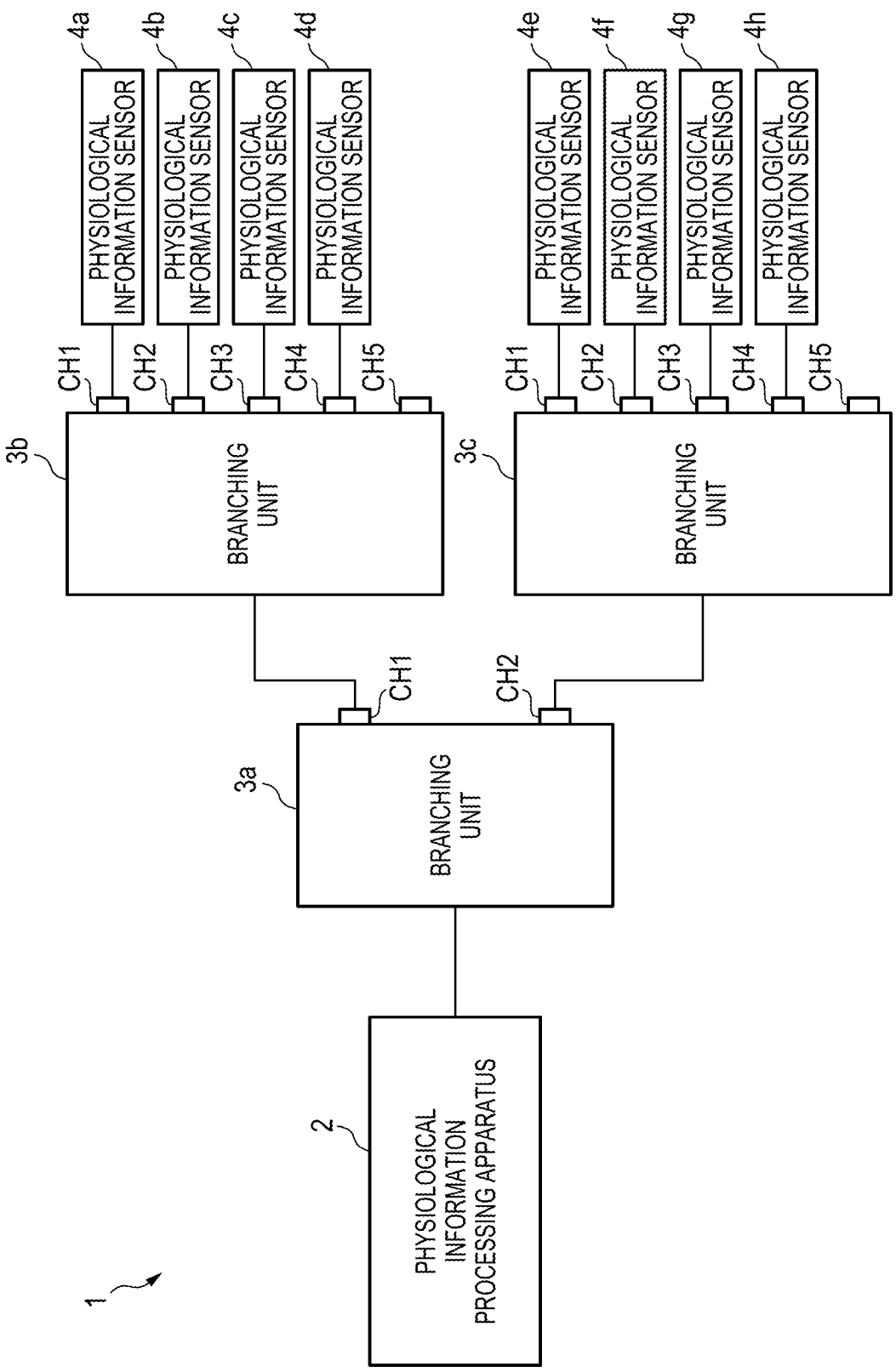
FIG. 1 illustrates an example of an entire configuration of a patient system in accordance with an exemplary embodiment of the presently disclosed subject matter (hereinafter, referred to as the exemplary embodiment)

Hereinafter, an exemplary embodiment will be described with reference to the drawings. First, an entire configuration of a patient system 1 in accordance with an exemplary embodiment of the presently disclosed subject matter (hereinafter, referred to as the exemplary embodiment) is described. FIG. 1 illustrates an example of the entire configuration of the patient system 1.

As shown in FIG. 1, the patient system 1 can include a physiological information processing apparatus 2 (hereinafter, simply referred to as 'processing device 2'), branching units 3a to 3c, and physiological information sensors 4a to 4h. As described later, the processing device 2 can have a USB (Universal Serial Bus) interface, and is communicatively connected to the branching unit 3a by a USB cable. The branching unit 3a is communicatively connected to the branching unit 3b and the branching unit 3c by USB cables. In particular, the branching unit 3b is connected to a connection port CH1 of the branching unit 3a. The branching unit 3c is connected to a connection port CH2 of the branching unit 3a. Each of the branching units 3a to 3c can include a USB hub having a plurality of connection ports, and one or more processors such as a CPU (Central Processing Unit).

Each of the physiological information sensors 4a to 4d can include a USB interface, and is communicatively connected to the branching unit 3b by a USB cable. In this respect, the physiological information sensor 4a is connected to a connection port CH1 of the branching unit 3b via a USB cable. The physiological information sensor 4b is connected to a connection port CH2 of the branching unit 3b via a USB cable. The physiological information sensor 4c is connected to a connection port CH3 of the branching unit 3b via a USB cable. The physiological information sensor 4d is connected to a connection port CH4 of the branching unit 3b via a USB cable.

Each of the physiological information sensors 4e to 4h can include a USB interface, and is communicatively connected to the branching unit 3c by a USB cable. In this respect, the physiological information sensor 4e is connected to a connection port CH1 the branching unit 3c via a USB cable. The physiological information sensor 4f is connected to a connection port CH2 of the branching unit 3c via a USB cable. The physiological information sensor 4g is connected to a connection port CH3 of the branching unit 3c via a USB cable. The physiological information sensor 4h is connected to a connection port CH4 of the branching unit 3c via a USB cable.

In this way, the processing device 2 is communicatively connected to the physiological information sensors 4a to 4d via the branching units 3a and 3b, and is communicatively connected to the physiological information sensors 4e to 4h via the branching units 3a and 3c. Meanwhile, in the exemplary embodiment, for convenience of descriptions, the patient system 1 includes the eight physiological information sensors. However, the number of the physiological information sensors is not particularly limited. Also, the number of the branching units is not particularly limited. In descriptions below, for convenience sake, the physiological information sensors 4a to 4h may be collectively referred to as 'physiological information sensor 4'. Also, the branching units 3a to 3c may be collectively referred to as 'branching unit 3'.

Figure 2:
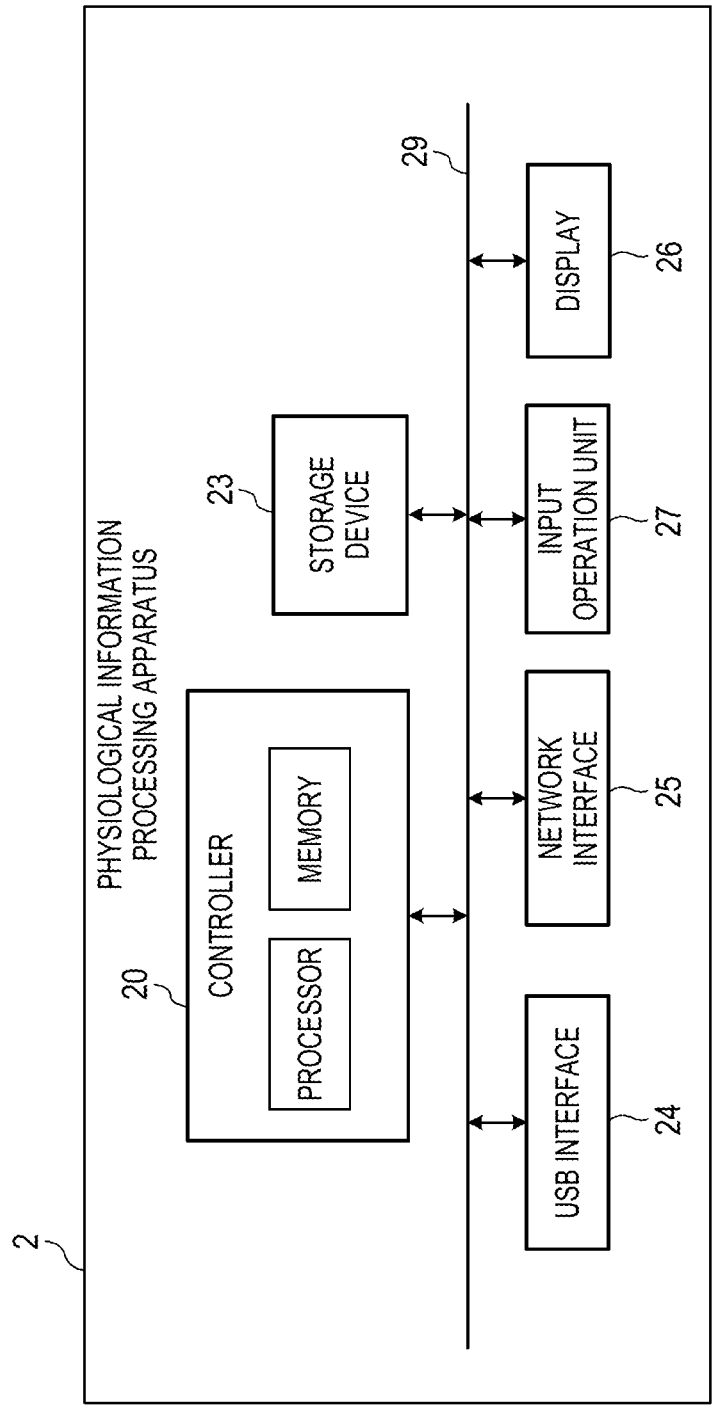
FIG. 2 illustrates an example of a configuration of a physiological information processing apparatus in accordance with the exemplary embodiment.

Subsequently, a configuration of the processing device 2 is described with reference to FIG. 2. FIG. 2 illustrates an example of the configuration of the processing device 2. As shown in FIG. 2, the processing device 2 can include a controller 20, a storage device 23, a USB interface 24, a network interface 25, a display 26, and an input operation unit 27. The constitutional elements are connected in communication with each other via a bus 29.

The processing device 2 may be a medical device (a patient monitor, and the like) configured to display trend graphs of a plurality of physiological information data of a subject being tested, and may be, for example, a personal computer, a workstation, a smart phone, a tablet, a wearable device (for example, a smart watch, an AR glass, and the like) to be mounted on a body (for example, an arm, a head, and the like) of a healthcare professional, and the like.

The controller 20 is configured to control operations of the processing device 2, and can include one or more memories and one or more processors. The one or more memories is configured to store a computer-readable command (program). For example, the one or more memories can be configured by a ROM (Read Only Memory) in which diverse programs and the like are stored, a RAM (Random Access Memory) having a plurality of work areas in which diverse programs and the like to be executed by the one or more processors are stored. Also, the one or more memories can be configured by one or more flash memories, and the like. The one or more processors may be, for example, a CPU, am MPU (Micro Processing Unit) and/or a GPU (Graphics Processing Unit). The CPU may be configured by a plurality of CPU cores. The GPU may be configured by a plurality of GPU cores. The one or more processors may be configured to develop a program, which is designated from the diverse programs incorporated in the storage device 23 or the ROM, on the RAM, and to execute a variety of processing in cooperation with the RAM.

The storage device 23 may be, for example, a storage device (storage) such as an HDD (Hard Disk Drive), an SSD (Solid State Drive), one or more flash memories and the like, and is configured to store programs and diverse data. In the storage device 23, the physiological information data of the subject being tested transmitted from the physiological information sensor 4 may be stored. For example, the transmitted physiological information data may be stored in the storage device 23 via the USB interface 24.

The network interface 25 is configured to connect the processing device 2 to a communication network. Specifically, the network interface 25 can include a variety of wired connection terminals for performing communication with an external apparatus such as a server via the communication network. Also, the network interface 25 can include a variety of processing circuits, an antenna and the like for performing wireless communication with an access point. A wireless communication standard between the access point and the processing device 2 may be, for example. Wi-Fi (registered trademark), Bluetooth (registered trademark), ZigBee (registered trademark), LPWA or fifth-generation mobile communication system (5G). The communication network can include at least one of LAN (Local Area Network), WAN (Wide Area Network) and Internet The display 26 may be a display device such as a liquid crystal monitor, an organic EL display, and the like, or may be a transmission type or non-transmission type head mount display to be mounted to an operator's head. Also, the display 26 may be a projector device configured to project an image on a screen.

The input operation unit 27 is configured to receive an input operation of the healthcare professional who operates the processing device 2, and to generate an instruction signal in accordance with the input operation. The input operation unit 27 may be, for example, a touch panel superimposed on the display 26, operation buttons attached on a housing, a mouse and/or a keyboard. After the instruction signal generated by the input operation unit 27 is transmitted to the controller 20 via the bus 29, the controller 20 executes a predetermined operation, in accordance with the instruction signal.

The USB interface 24 is an interface of a USB standard for communicatively connecting the processing device 2 to peripheral devices such as the physiological information sensor 4, the branching unit 3 and the like. The USB interface 24 can include a connection terminal to which a connector of the USB cable is to be input.

Figure 3:
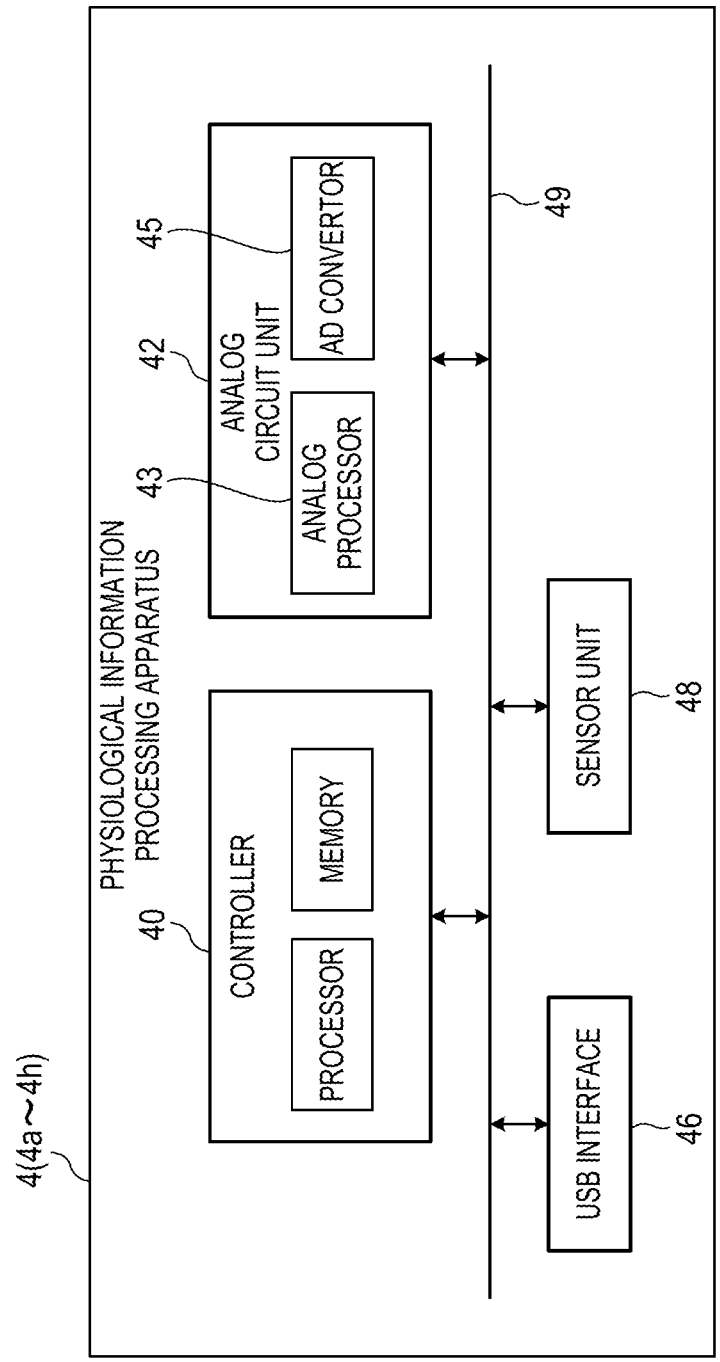
FIG. 3 illustrates an example of a configuration of a physiological information sensor in accordance with the exemplary embodiment.

Subsequently, a configuration of the physiological information sensor 4 (each of the physiological information sensors 4a to 4h) is described with reference to FIG. 3. FIG. 3 illustrates an example of the configuration of the physiological information sensor 4. In descriptions below, the configuration of the physiological information sensor 4, which is a collective name of the physiological information sensors 4a to 4h, is described. As shown in FIG. 3, the physiological information sensor 4 can include a controller 40, an analog circuit unit 42, a USB interface 46, and a sensor unit 48. The constitutional elements are connected in communication with each other via a bus 49.

The controller 40 is configured to control operations of the physiological information sensor 4, and can include one or more memories and one or more processors. The one or more memories can include a ROM and a RAM. The one or more processors may be, for example, a CPU, a GPU and/or an MPU. The USB interface 46 is an interface of a USB standard for communicatively connecting the physiological information sensor 4 to the peripheral devices such as the processing device 2, the branching unit 3 or the like. The USB interface 46 can include a connection terminal to which a connector of the USB cable is to be input. The sensor unit 48 is configured to acquire the physiological information data of the subject being tested, as analog data. In a case in which the physiological information sensor is an electrocardiogram sensor, the sensor unit 48 is configured to acquire electrocardiogram data (an example of the physiological information data) of the subject being tested. Also, in a case in which the physiological information sensor is a pulse sensor, the sensor unit 48 is configured to acquire pulse data (an example of the physiological information data) of the subject being tested. In this case, the sensor unit 48 can include a light-emitting unit configured to emit red light and/or infrared light toward a patient tissue such as a finger of the subject being tested, and a light-receiving unit configured to receive the red light and/or infrared light emitted from the light-emitting unit and penetrating the subject being tested or reflected therefrom. The sensor unit 48 can be mounted a part of the body of the subject being tested. Meanwhile, in the exemplary embodiment, the type of the physiological information sensor 4 is not particularly limited, and the physiological information sensor 4 may be, an electrocardiogram sensor, a pulse sensor, a blood pressure sensor, a body temperature sensor, a respiration sensor, or the like. Also, the physiological information sensors 4a to 4h may be different kinds of physiological information sensors. For example, the physiological information sensor 4a may be an electrocardiogram sensor configured to acquire electrocardiogram data as the physiological information data, and the physiological information sensor 4b may be a pulse sensor configured to acquire pulse data as the physiological information data.

The analog circuit unit 42 can include an analog processor 43, and an AD convertor 45. The analog processor 43 is configured to execute predetermined processing for the physiological information data (analog data) acquired by the sensor unit 48. For example, the analog processor 43 is configured to amplify the physiological information data and to filter a noise component (for example, a high-frequency component) of the amplified physiological information data. The AD convertor 45 is configured to execute AD conversion processing for the physiological information data output from the analog processor 43, based on a control signal output from the controller 40. That is, the AD convertor 45 is configured to convert the physiological information data, which is analog data, into digital data. Here, the AD conversion processing can include a series of processing including sampling processing, quantization processing and encoding processing. In particular, the controller 40 may be configured to generate a control signal as an SOF (Start of Frame) is received via the USB interface 46, and to transmit the control signal to the AD convertor 45. Thereafter, the AD convertor 45 may be configured to start the AD conversion processing for the physiological information data (analog data) as the control signal is received.

In the exemplary embodiment, the physiological information sensor 4 is connected to the branching unit 3 by the USB cable. However, the exemplary embodiment is not limited thereto. For example, each physiological information sensor 4 may be connected to a multi-sensor processing unit by a UART cable, and may be configured to transmit and receive data to and from the multi-sensor processing unit in a UART manner. The multi-sensor processing unit may be configured to transmit and receive data in a same or similar manner to the branching unit 3.

The multi-sensor processing unit is not limited to the UART manner and may be configured to perform data communication in other manner such as analog communication and the like.

Figure 6A:
FIG. 6A illustrates each packet that is to be transferred in one transaction.
Figure 6B:
FIG. 6B illustrates an example of a configuration of a token packet.
Figure 6C:
FIG. 6C illustrates an example of a configuration of a data packet.
Figure 6D:
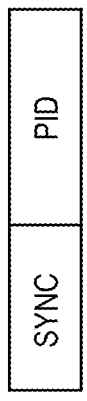
FIG. 6D illustrates an example of a configuration of a handshake packet.
Figure 7:
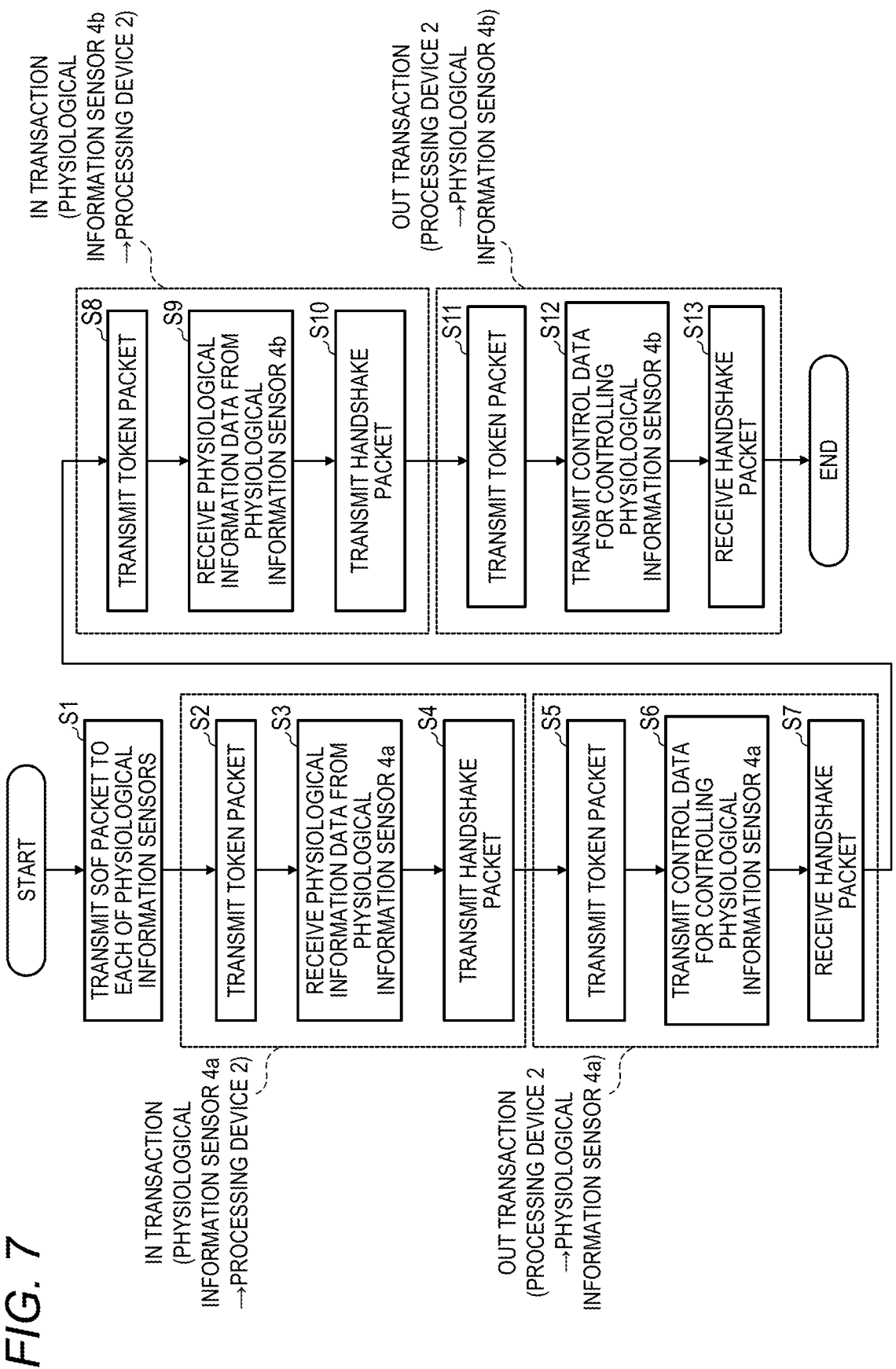
FIG. 7 is a flowchart for illustrating an example of processing that is to be executed in a first subframe of the $n^{th}$ main frame by the patient system.
Figure 8:
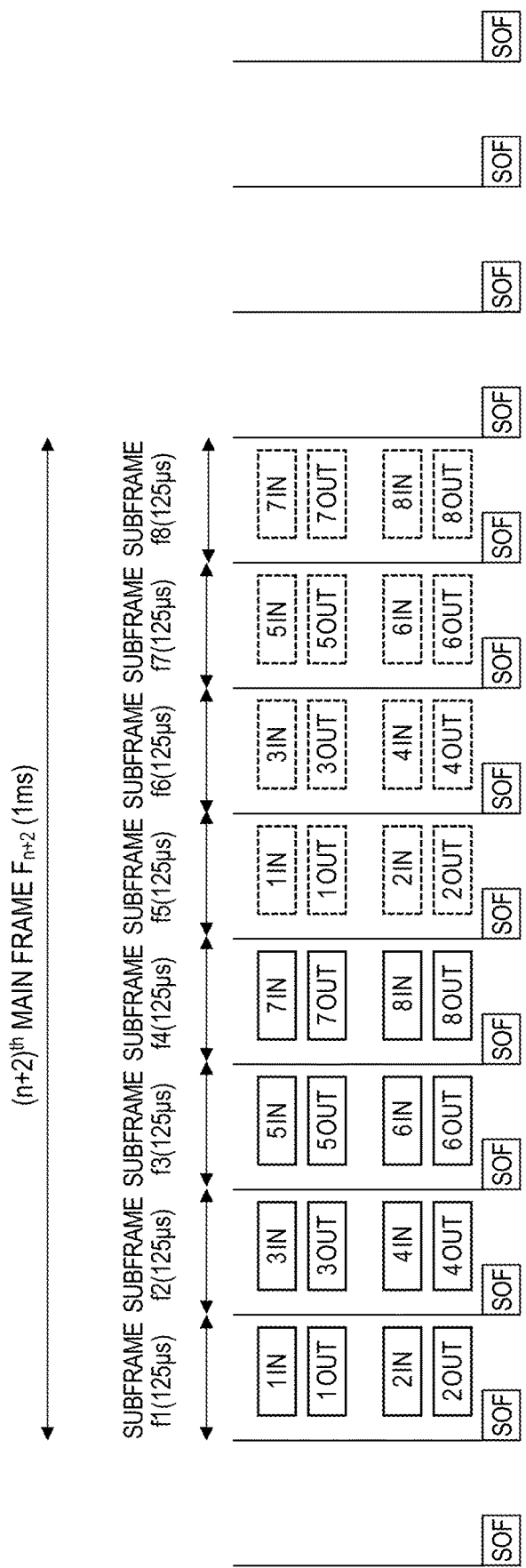
FIG. 8 illustrates a plurality of subframes included in a $(n+2)^{th}$ main frame and transactions that are to be executed in each of the subframes.

Subsequently, an operation example of the patient system 1 in accordance with the exemplary embodiment is described with reference to FIGS. 4 to 8. In particular, it is described how each of the physiological information sensors 4a to 4h transmits the physiological information data (digital data) to the processing device 2, with reference to FIGS. 4 to 8. FIG. 4 illustrates an $n^{th}$ main frame $F_n$ to a $(n+3)^{th}$ main frame $F_{n+3}$. FIG. 5 illustrates eight subframes f1 to f8 included in the $n^{th}$ main frame $F_n$ and transactions that are to be executed in each of the subframes f1 to f8. FIG. 6A illustrates each packet that is to be transferred in one transaction. FIG. 6B illustrates an example of a configuration of a token packet. FIG. 6C illustrates an example of a configuration of a data packet. FIG. 6D illustrates an example of a configuration of a handshake packet. FIG. 7 is a flowchart for illustrating an example of processing that is to be executed in a first subframe of the $n^{th}$ main frame by the patient system 1. FIG. 8 illustrates a plurality of subframes f1 to f8 included in a $(n+2)^{th}$ main frame and transactions that are to be executed in each of the subframes f1 to f8.

As shown in FIG. 4, in the patient system 1 in accordance with the exemplary embodiment, physiological information data transfer is executed in the $n^{th}$ main frame $F_n$ (n: natural number) and the $(n+2)^{th}$ main frame $F_{n+2}$. In other words, in the main frames $F_n$ and $F_{n+2}$, each of the physiological information sensors 4a to 4h transmits the physiological information data (digital data) to the processing device 2, as a packet. In the meantime, in the $(n+1)^{th}$ main frame $F_{n+1}$ and the $(n+3)^{th}$ main frame $F+_3$, the physiological information data transfer is not executed. In other words, in the main frames $F_{n+1}$ and $F_{n+3}$, each of the physiological information sensors 4a to 4h does not transmit the physiological information data (digital data) to the processing device 2, as a packet. That is, in the patient system 1, while the patent data transfer (transaction) is executed in a $(n+2i)^{th}$ main frame $F_{n+2i}$ (i: integer of 0 or greater), the patent data transfer (transaction) is not executed in a $(n+2i+1)^{th}$ main frame $F_{n+2i+1}$. Each main frame has a frame length of 1 ms. Also, as described later, each main frame has eight subframes each of which has a frame length of 125 μs.

Subsequently, the $n^{th}$ main frame $F_n$ is described in detail with reference to FIG. 5. As shown in FIG. 5, the main frame $F_n$ is divided into eight subframes f1 to f8 (an example of a first subframe). Each of the subframes f1 to f8 has a frame length of 125 μs. The frame length (time length) of the subframe is prescribed by a time interval between time at which the processing device 2 (host) transmits a predetermined SOF packet and time at which the processing device 2 transmits a next SOF packet of the predetermined SOF packet. In this way, the frame length of the subframe is previously defined by a transmission interval of the SOF packet. Not only the main frame $F_n$ but also the other main frames are divided into the eight subframes f1 to f8 in a same or similar manner. In this way, the processing device 2 is configured to broadcast the SOF packet toward each of the physiological information sensors 4a to 4h every time interval of 125 μs.

Also, as shown in FIG. 5, the transaction between the physiological information sensor 4 and the processing device 2 is executed in the subframe. Particularly, in the exemplary embodiment, four transactions are executed in each of the subframes f1 to f8. Here, in one transaction, a token packet, a data packet and a handshake packet are transferred, as shown in FIG. 6A. In one transaction, after the token packet is transferred, the data packet is transferred and the handshake packet is transferred at the end.

The token packet is configured by SYNC data (8 bits) for synchronization, PID data (4 bits) indicative of an identifier of the token packet, ADDR data (7 bits) indicative of a USB address, ENDP data (4 bits) indicative of an end point, and CRC data (5 bits) for check code, for example (refer to FIG. 6B).

The data packet is configured by SYNC data (8 bits) for synchronization, PID data (4 bits) indicative of an identifier of the data packet, transmission data (0-1023 bytes) corresponding to physiological information data or the like, and CRC data (5 bits) for check code, for example (refer to FIG. 6C). The handshake packet can include, for example, SYNC data (8 bits) for synchronization and PID data (4 bits) indicative of an identifier of the handshake packet (refer to FIG. 6D).

Also, the transaction includes two types of transactions, i.e., IN transaction and OUT transaction. In IN transaction, the processing device 2 (host) receives data from the physiological information sensor 4 (target). On the other hand, in OUT transaction, the processing device 2 (host) transmits data to the physiological information sensor 4 (target). For example, "1 IN" shown in FIG. 5 indicates IN transaction between the physiological information sensor 4 first connected to the branching unit 3 and the processing device 2. On the other hand, "1 OUT" indicates OUT transaction between the physiological information sensor 4 first connected to the branching unit 3 and the processing device 2. Like this, "i IN" (i: natural number) indicates IN transaction between the physiological information sensor 4 $i^{th}$ connected to the branching unit 3 and the processing device 2. On the other hand, "i OUT" indicates OUT transaction between the physiological information sensor 4 $i^{th}$ connected to the branching unit 3 and the processing device 2.

In the exemplary embodiment, it is assumed that the physiological information sensors 4a to 4h are respectively connected to the branching unit 3 according to a following sequence.

physiological information sensor first connected to the branching unit 3: physiological information sensor 4a
physiological information sensor second connected to the branching unit 3: physiological information sensor 4b
physiological information sensor third connected to the branching unit 3: physiological information sensor 4c
physiological information sensor fourth connected to the branching unit 3: physiological information sensor 4d
physiological information sensor fifth connected to the branching unit 3: physiological information sensor 4e
physiological information sensor sixth connected to the branching unit 3: physiological information sensor 4f
physiological information sensor seventh connected to the branching unit 3: physiological information sensor 4g
physiological information sensor eighth connected to the branching unit 3: physiological information sensor 4h

From the description above, in the first subframe f1, after IN transaction ("1 IN") between the physiological information sensor 4a first connected to the branching unit 3 and the processing device 2 is executed, OUT transaction ("1 OUT") between the physiological information sensor 4a and the processing device 2 is executed. Then, after IN transaction ("2 IN") between the physiological information sensor 4b second connected to the branching unit 3 and the processing device 2 is executed, OUT transaction ("2 OUT") between the physiological information sensor 4b and the processing device 2 is executed.

Four transactions that are to be executed in the subframe f1 by the patient system 1 are specifically described with reference to FIG. 7. First, in step S1, the processing device 2 transmits (broadcasts) the SOF packet to each of the physiological information sensors 4a to 4h. Then, in step S2, the processing device 2 transmits the token packet, which designates the physiological information sensor 4a, to the physiological information sensors 4a to 4h. When the token packet, which designates the physiological information sensor 4a, is received, the physiological information sensor 4a transmits the physiological information data (digital data) stored in the one or more memories to the processing device 2, as the data packet (step S3). Then, after receiving the physiological information data from the physiological information sensor 4a, the processing device 2 transmits the handshake packet (ACK) to the physiological information sensor 4a (step S4). In this way, IN transaction between the physiological information sensor 4a and the processing device 2 is executed. In the meantime, in the exemplary embodiment, the processing device 2 (host) may transfer data to the physiological information sensor 4 (target) in a unicast manner.

Then, in step S5, the processing device 2 transmits the token packet, which designates the physiological information sensor 4a, to the physiological information sensors 4a to 4h. Thereafter, the processing device 2 transmits control data for controlling operations of the physiological information sensor 4a stored in the one or more memories to the physiological information sensors 4a to 4h (step S6). For example, in a case in which the physiological information sensor 4a is a pulse sensor, the control data may be control data for controlling operations of the light-emitting unit or the light-receiving unit. Also, the control data may be control data for controlling operations of the analog circuit unit 42. Then, when the control data is received, the physiological information sensor 4a transmits the handshake packet (ACK) to the processing device 2 (step S7). In this way, OUT transaction between the physiological information sensor 4a and the processing device 2 is executed.

Then, after a predetermined time period elapses, the processing device 2 transmits the token packet, which designates the physiological information sensor 4b, to the physiological information sensors 4a to 4h. (step S8). When the token packet, which designates the physiological information sensor 4b, is received, the physiological information sensor 4b transmits the physiological information data (digital data) stored in the one or more memories to the processing device 2, as the data packet (step S9). Then, after receiving the physiological information data from the physiological information sensor 4b, the processing device 2 transmits the handshake packet (ACK) to the physiological information sensor 4b (step S10). In this way, IN transaction between the physiological information sensor 4b and the processing device 2 is executed.

Then, in step S11, the processing device 2 transmits the token packet, which designates the physiological information sensor 4b, to the physiological information sensors 4a to 4h. Thereafter, the processing device 2 transmits control data for controlling operations of the physiological information sensor 4b stored in the one or more memories to the physiological information sensors 4a to 4h (step S12). Then, when the control data is received, the physiological information sensor 4b transmits the handshake packet (ACK) to the processing device 2 (step S13). In this way, OUT transaction between the physiological information sensor 4b and the processing device 2 is executed.

By the same or similar method to the flowchart shown in FIG. 7, the four transactions are executed in each of the subframes f2 to f8. In particular, as shown in FIG. 5, a following transaction is executed in each of the subframes f2 to f4. Meanwhile, in descriptions below, the transaction between the physiological information sensor 4 and the processing device 2 is simply referred to as 'transaction of the physiological information sensor 4'.

<The Subframe f2>
    IN transaction ("3 IN") of the physiological information sensor 4c
    OUT transaction ("3 OUT") of the physiological information sensor 4c
    IN transaction ("4 IN") of the physiological information sensor 4d
    OUT transaction ("4 OUT") of the physiological information sensor 4d <The Subframe f3>
    IN transaction ("5 IN") of the physiological information sensor 4e
    OUT transaction ("5 OUT") of the physiological information sensor 4e
    IN transaction ("6 IN") of the physiological information sensor 4f
    OUT transaction ("6 OUT") of the physiological information sensor 4f <The Subframe f4>
    IN transaction ("7 IN") of the physiological information sensor 4g
    OUT transaction ("7 OUT") of the physiological information sensor 4g
    IN transaction ("8 IN") of the physiological information sensor 4h
    OUT transaction ("8 OUT") of the physiological information sensor 4h Also, in the subframe f5, the four transactions executed in the subframe f1 are again executed. Specifically, in the subframe f5, after IN transaction ("1 IN") between the physiological information sensor 4a and the processing device 2 is executed, OUT transaction ("1 OUT") between the physiological information sensor 4a and the processing device 2 is executed. Then, after IN transaction ("2 IN") between the physiological information sensor 4b and the processing device 2 is executed, OUT transaction ("2 OUT") between the physiological information sensor 4b and the processing device 2 is executed. The same or Similarly, in the subframe f6, the four transactions executed in the subframe f2 are again executed. In the subframe f7, the four transactions executed in the subframe f3 are again executed. In the subframe f8, the four transactions executed in the subframe f4 are again executed. In this way, in the subframes f5 to f8, the transactions executed in the subframes f1 to f4 are again executed. That is, the physiological information data and control data transferred in the subframes f1 to f4 are again transferred in the subframes f5 to f8.

According to the exemplary embodiment, since the same physiological information data is transmitted two times from the physiological information sensor 4 in the main frame $F_n$, it is possible to provide redundancy to the physiological information data that is to be transmitted from each of the physiological information sensors 4a to 4h. In this way, it is possible to improve reliability of each physiological information data.

Subsequently, the $(n+2)^{th}$ main frame $F_{n+2}$ is described in detail with reference to FIG. 8. As shown in FIG. 8, the same as or similarly to the main frame $F_n$, the main frame $F_{n+2}$ is also divided into eight subframes f1 to f8 (an example of a second subframe each of which has a frame length of 125 μs. In the subframe f1, after IN transaction of the physiological information sensor 4a is executed, OUT transaction of the physiological information sensor 4a is executed. Then, after IN transaction of the physiological information sensor 4b is executed, OUT transaction of the physiological information sensor 4b is executed. That is, the four transactions that are to be executed in the subframe f1 of the $(n+2)^{th}$ main frame $F_{n+2}$ is the same as the four transactions that are to be executed in the subframe f1 of the $n^{th}$ main frame $F_n$. The same as or similarly, the four transactions that are to be executed in each of the subframes f2 to f8 of the main frame $F_{n+2}$ are the same as the four transactions that are to be executed in each of the subframes f2 to f8 of the main frame $F_n$.

Also, the four transactions that are to be executed in each of the subframes f1 to f8 of the $(n+2i)^{th}$ main frame $F_{n+2i}$ (i: natural number) are the same as the four transactions that are to be executed in each of the subframes f1 to f8 of the main frame $F_n$. For example, the four transactions that are to be executed in the subframe f1 of the main frame $F_{n+2i}$ are the same as the four transactions that are to be executed in the subframe f1 of the main frame $F_n$. Also, the four transactions that are to be executed in the subframe f2 of the main frame $F_{n+2i}$ are the same as the four transactions that are to be executed in the subframe f2 of the main frame $F_n$. In this way, in the exemplary embodiment, in each main frame, a sequence of the subframes in which the transactions of the physiological information sensor 4 are to be executed is fixed. In other words, in each main frame, a sequence of the subframes in which the physiological information data is to be transferred is fixed. In this way, since the processing device 2 can acquire the physiological information data with a substantially constant period from each of the physiological information sensors 4a to 4h, it is possible to improve real time processing for the received physiological information data while maintaining periodicity of the processing for the physiological information data.

Also, according to the exemplary embodiment, since two IN transaction are executed (i.e., two different physiological information data are transferred) in one subframe, it is possible to improve real time processing for each physiological information data while maintaining periodicity of the processing for each physiological information data. Meanwhile, in the exemplary embodiment, two IN transactions and two OUT transactions are executed in one subframe. However, the exemplary embodiment is not limited thereto. For example, two or more IN transactions and two or more OUT transactions may be executed in one subframe. Also, after four IN transactions are executed in the subframe f1, four OUT transactions may be executed in the subframe f2. Also in this case, in each main frame, if a sequence of the subframes allocated to the transactions of the physiological information sensor 4 is fixed, it is possible to make the transfer period of each physiological information data substantially constant.

Also, the processing device 2 of the exemplary embodiment is configured, even when there is an error in the received predetermined physiological information data, not to request the physiological information sensor 4, which transmits the predetermined physiological information data, to retransmit the predetermined physiological information data. In this way, in each main frame, since a sequence of the subframes allocated to the transactions of the physiological information sensor 4 is maintained, it is possible to make the transfer period of each physiological information data substantially constant.

In the exemplary embodiment, in each main frame, the sequence of the subframes in which the transactions of the physiological information sensor 4 are to be executed is fixed. However, the exemplary embodiment is not limited thereto. Specifically, in the exemplary embodiment, the transactions that are to be executed in an $x^{th}$ subframe $f_x$ of the main frame $F_n$ are executed in the subframe $f_x$ of each main frame $F_{n+2i}$. On the other hand, transaction A that is to be executed in the subframe $f_x$ of the main frame $F_n$ may be executed in a $y^{th}$ subframe $f_y$ of each main frame $F_{n+2i}$. In particular, the transaction A that is to be executed in the subframe $f_x$ of the main frame $F_n$ may be executed in a $(x+1)^{th}$ subframe $f_{x+1}$ of each main frame $F_{n+2i}$ or may be executed in a $(x-1)^{th}$ subframe $f_{x-1}$ of each main frame $F_{n+2i}$. In this case, $y=x\pm1$. In this way, y is determined on the basis of x. Also, the transaction A that is to be executed in the subframe $f_x$ of the main frame $F_n$ may be executed in the $x^{th}$ subframe $f_x$ of a main frame $F_{n+4}$ after being executed in the $(x+1)^{th}$ subframe $f_{x+1}$ of a main frame $F_{n+2}$. Thereafter, the transaction A may be executed in the $x^{th}$ subframe $f_x$ of a main frame $F_n$+s after being executed in an $x^{th}$ subframe $f_{x-1}$ of a main frame $F_{n+6}$. In this way, in each main frame, the sequence of the subframes in which the physiological information data is transferred is not necessarily required to be fixed.

First Modified Embodiment

Figure 9:
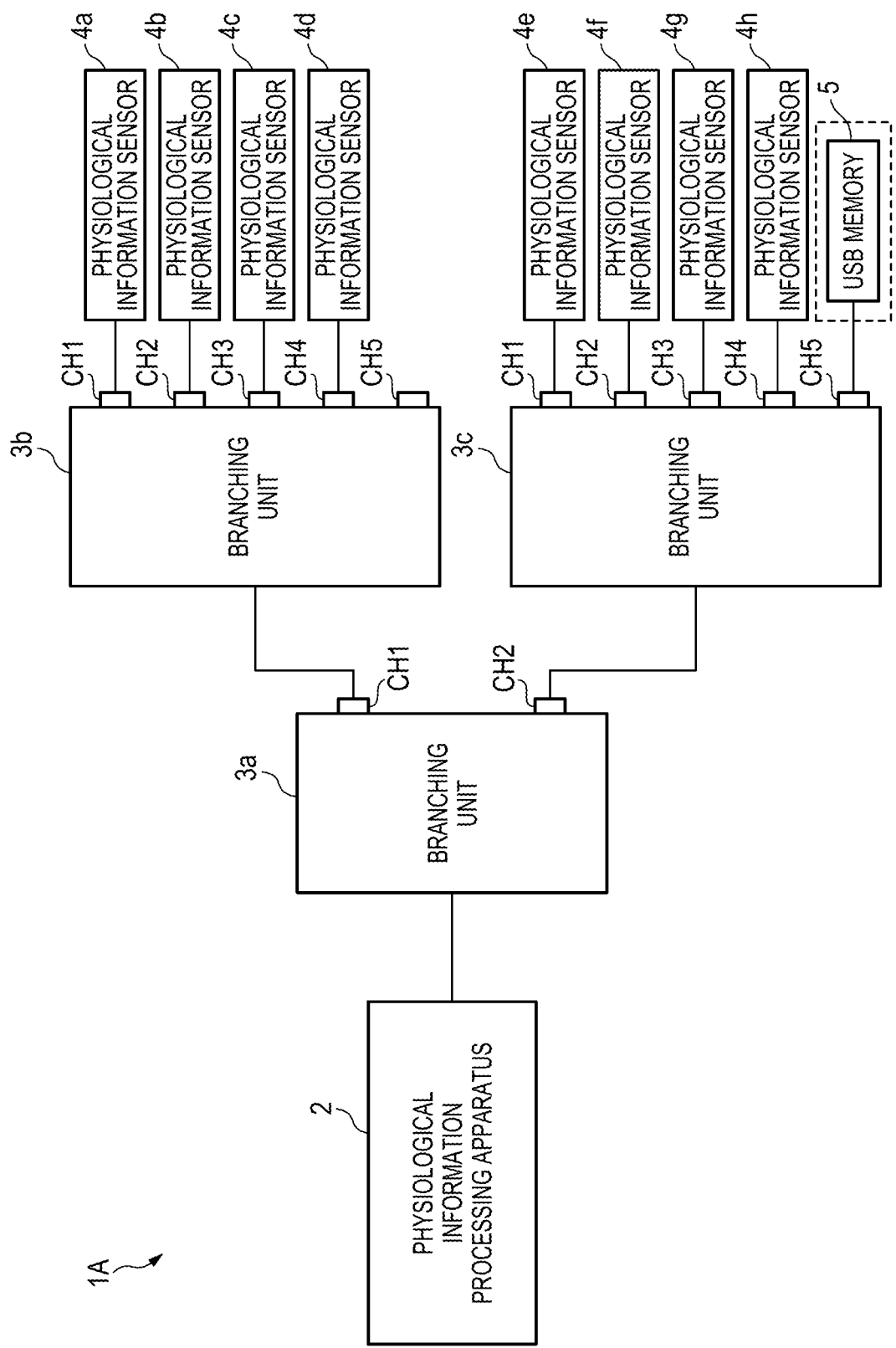
FIG. 9 illustrates the patient system in which a USB memory is newly connected to a branching unit.
Figure 10:
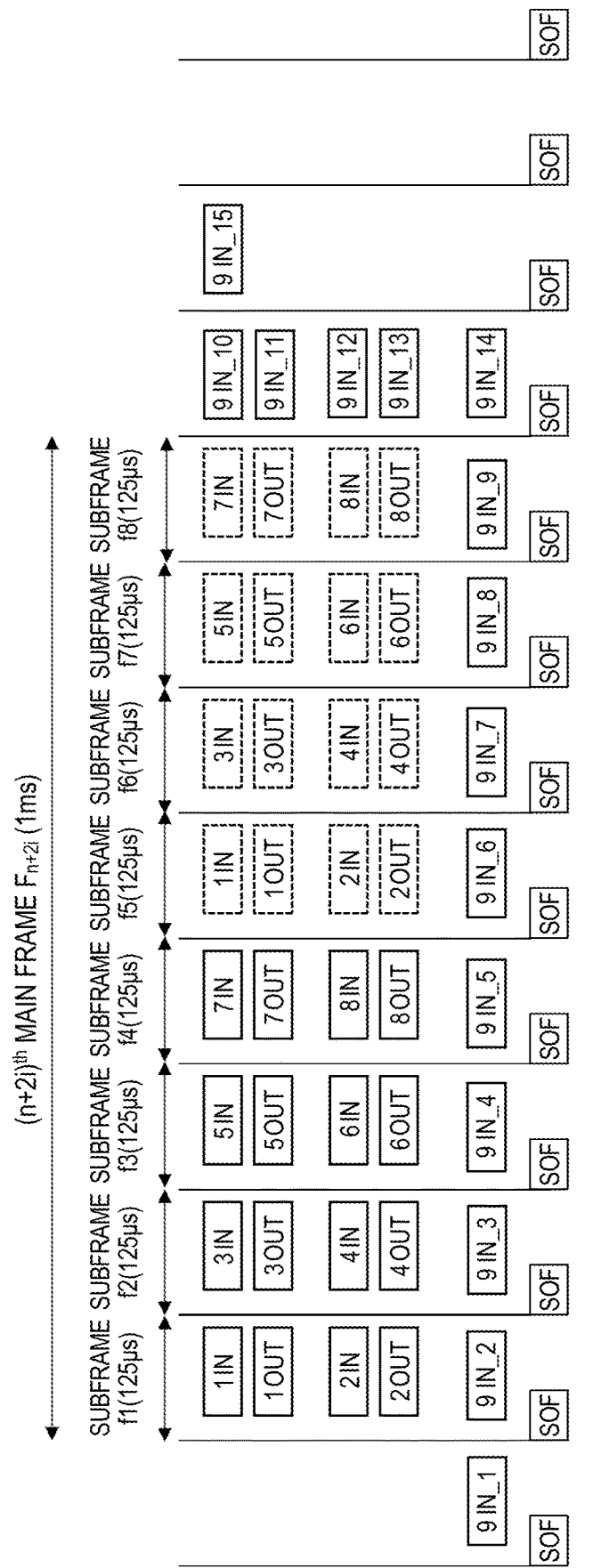
FIG. 10 illustrates transactions of each of the physiological information sensors and transactions relating to split bulk data.

Subsequently, an operation example of a patient system 1A in accordance with a first modified embodiment is described with reference to FIGS. 9 and 10. FIG. 9 illustrates the patient system 1A in which the USB memory 5 is newly connected to the branching unit 3c. FIG. 10 illustrates transactions of each of the physiological information sensors 4a to 4h and transactions relating to split bulk data. The patient system 1A is different from the patient system 1 shown in FIG. 1, in that the USB memory 5 is connected to the connection port CH5 of the branching unit 3c.

As shown in FIG. 9, in a state in which each of the physiological information sensors 4a to 4h is connected to the branching unit 3, the USB memory 5 is newly connected to the branching unit 3c. Thereafter, bulk data stored in the USB memory 5 is transferred to the processing device 2. In this respect, the USB memory 5 splits the bulk data into a plurality of packets and then transmits the split bulk data (hereinafter, referred to as "split bulk data") to the processing device 2. As shown in FIG. 10, "9 IN_1" indicates IN transaction relating to the split bulk data, which is to be first transferred, of the split bulk data to be transferred from the USB memory 5 to the processing device 2. Like this, "9 IN_i" (i: natural number) indicates IN transaction relating to the split bulk data, which is to be $i^{th}$ transferred, of the split bulk data to be transferred from the USB memory 5 to the processing device 2.

As shown in FIG. 10, in each of the subframes f1 to f8 of the $(n+2i)^{th}$ main frame $F_{n+2i}$, IN transaction relating to the split bulk data can be executed. In other words, in each of the subframes f1 to f8 of the main frame $F_{n+2i}$, the processing device 2 can receive the split bulk data. In this respect, the processing device 2 may first consider an empty capacity of data transfer in each of the subframes f1 to f8, and then determine whether or not to execute the transaction relating to the split bulk data in each of the subframes f1 to f8. For example, when it is determined that an empty capacity of data transfer in the subframe f1 is insufficient, the processing device 2 may not execute the transaction relating to the split bulk data in the subframe f1. In IN transaction relating to the split bulk data, as shown in FIG. 6A, the token packet, which designates the USB memory 5, is first transmitted (broadcast) from the processing device 2. Then, the data packet including the split bulk data is transmitted from the USB memory 5 to the processing device 2. Finally, the handshake packet (ACK) is transmitted from the processing device 2.

Also, as shown in FIG. 10, while the transaction relating to the split bulk data is executed in each of the subframes f1 to f8, the sequence of the subframes allocated to IN transaction and OUT transaction of each of the physiological information sensors 4a to 4h is maintained. In this way, in the patient system 1A of the first modified embodiment, the processing device 2 can acquire the bulk data from the USB memory 5 in real time, and can acquire the physiological information data from each of the physiological information sensors 4a to 4h with a substantially constant period. Thus, it is possible to transfer large volumes of bulk data at the same time while maintaining the periodicity and real time of the processing for each physiological information data.

In the meantime, the bulk data can be transmitted and received in any empty subframe (any subframe in which there is no data to be transmitted, i.e., any subframe having an empty data band).

Second Modified Embodiment

Figure 11:
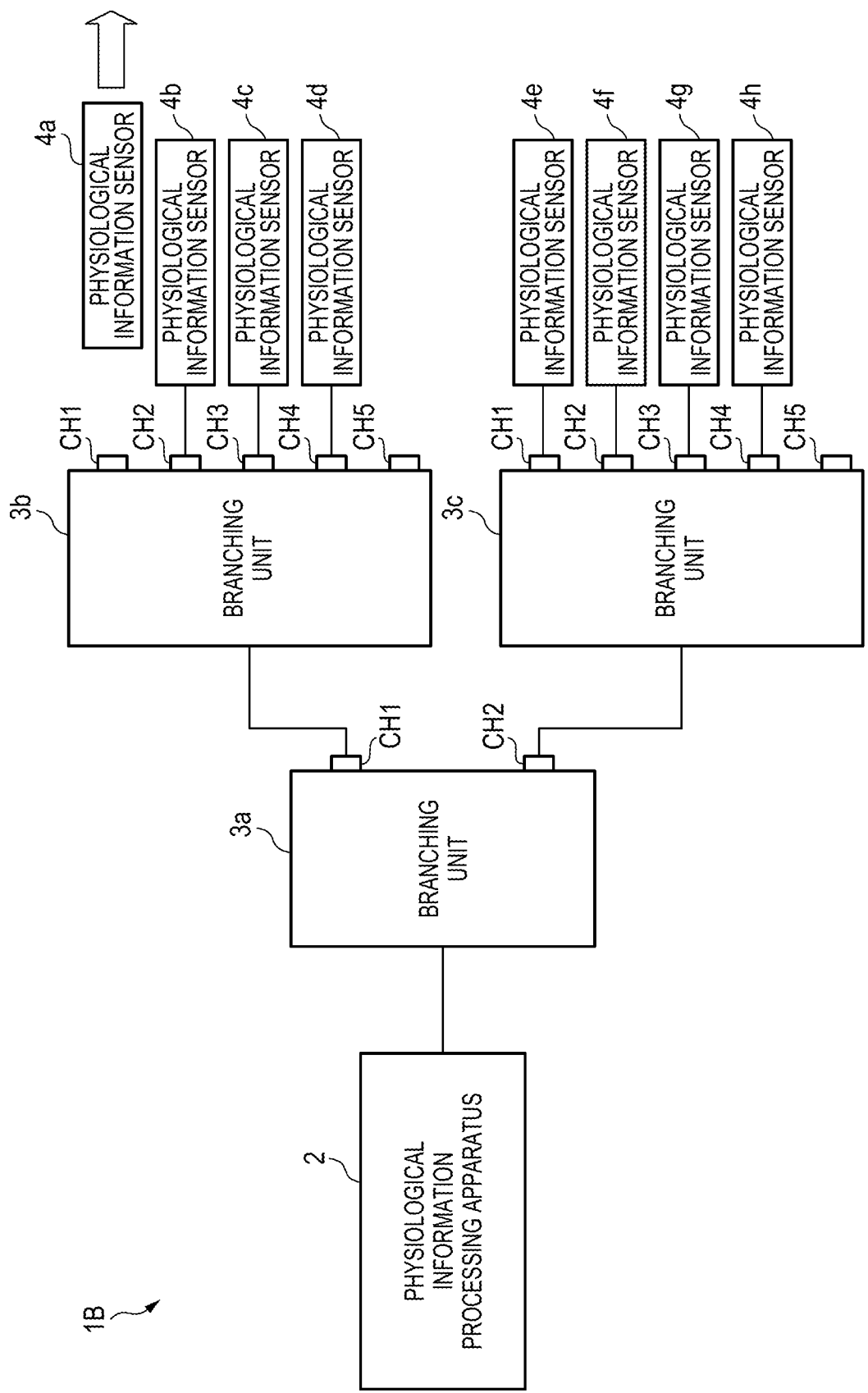
FIG. 11 illustrates the patient system in which one physiological information sensor is detached from the branching unit.
Figure 12:
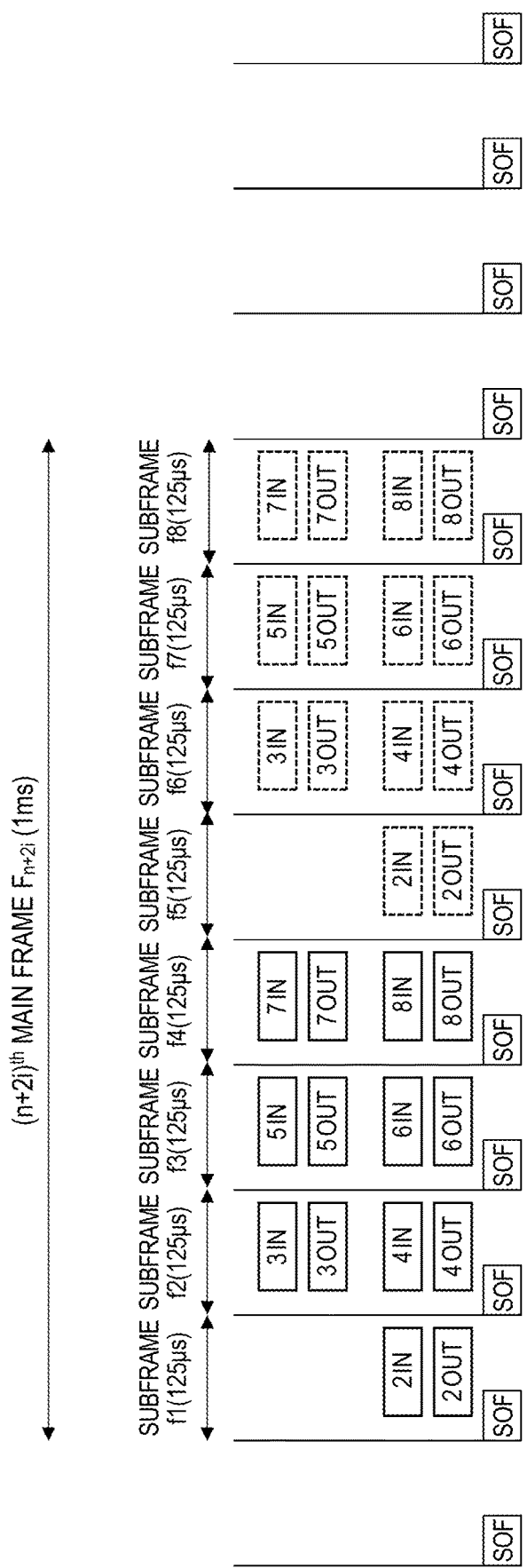
FIG. 12 illustrates transactions of each of the physiological information sensors in the patient system shown in FIG. 11.

Subsequently, an operation example of a patient system 1B in accordance with a second modified embodiment is described with reference to FIGS. 11 and 12. FIG. 11 illustrates the patient system 1B in which the physiological information sensor 4a is detached from the branching unit 3b. FIG. 12 illustrates transactions of each of the physiological information sensors 4a to 4h in the patient system 1B shown in FIG. 11. The patient system 1B is different from the patient system 1 shown in FIG. 1, in that the physiological information sensor 4a is detached from the connection port CH1 of the branching unit 3b.

As shown in FIG. 12, in a case in which the physiological information sensor 4a is detached from the branching unit 3b (i.e., in a case in which communication between the physiological information sensor 4a and the processing device 2 is disconnected), the transaction of the physiological information sensor 4a is not executed in the subframes f1 and f5. In this state, the sequence of the subframes allocated to the transactions of the physiological information sensors 4b to 4h (i.e., each physiological information data of the physiological information sensors 4b to 4h) is maintained. In this way, even when communication between the physiological information sensor 4 and the processing device 2 is disconnected, it is possible to make the transfer period of each physiological information data substantially constant.

Third Modified Embodiment

Figure 13:
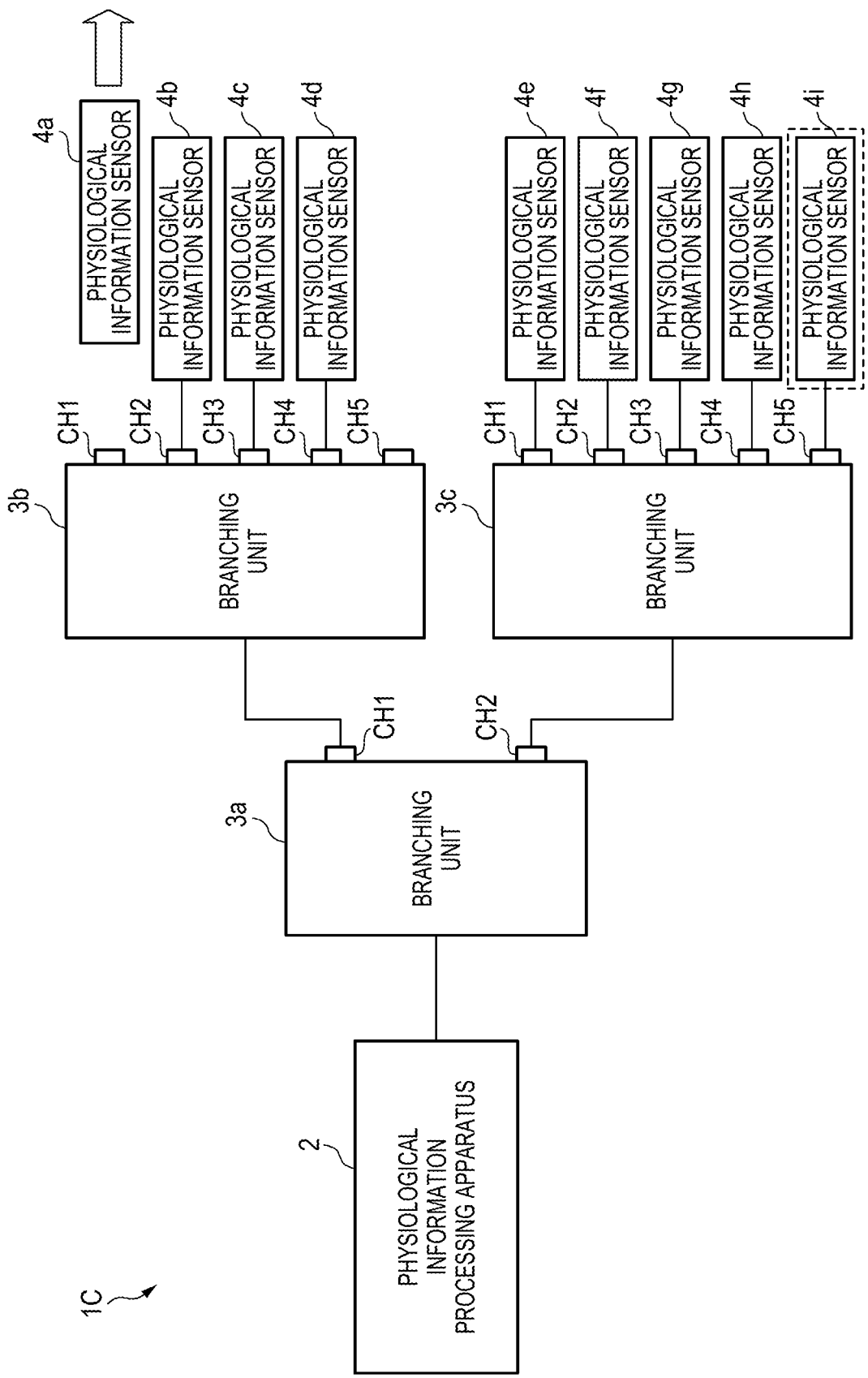
FIG. 13 illustrates the patient system in which one physiological information sensor is detached from the branching unit and another physiological information sensor is newly connected to the branching unit.
Figure 14:
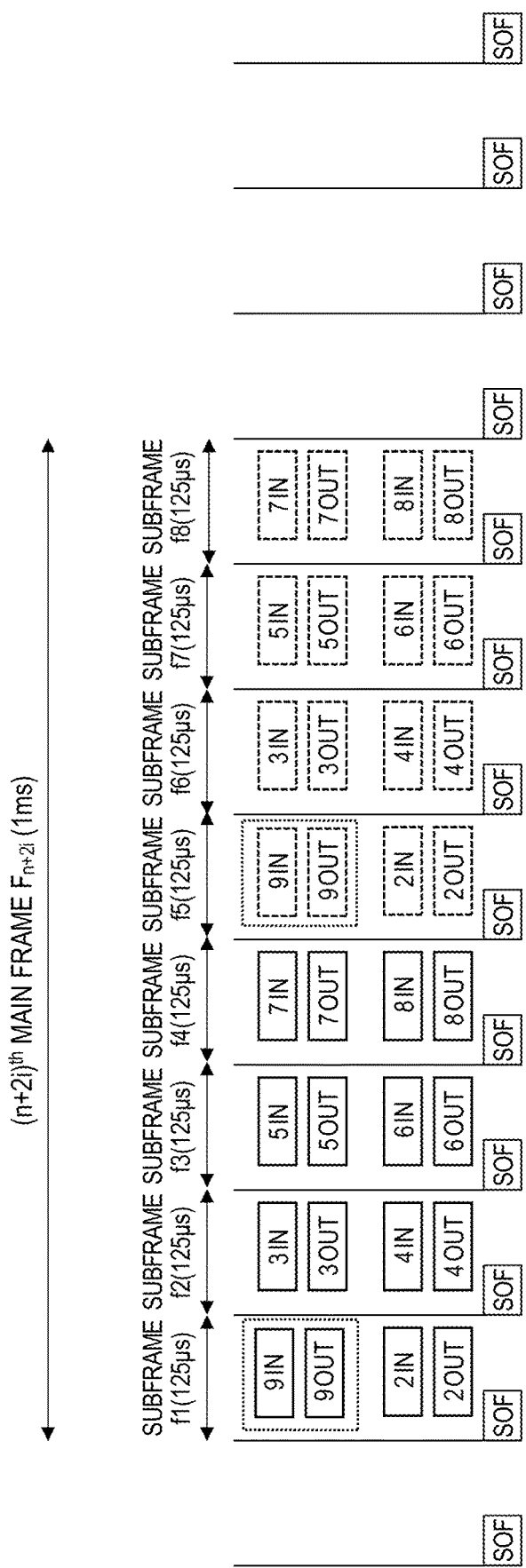
FIG. 14 illustrates transactions of each of the physiological information sensors in the patient system shown in FIG. 13.

Subsequently, an operation example of a patient system 1C in accordance with a third modified embodiment is described with reference to FIGS. 13 and 14. FIG. 13 illustrates the patient system 1C in which the physiological information sensor 4a is detached from the branching unit 3b and a physiological information sensor 4i is newly connected to the branching unit 3c. FIG. 14 illustrates transactions of each of the physiological information sensors 4b to 4i in the patient system 1C shown in FIG. 13. The patient system 1C is different from the patient system 1B shown in FIG. 11, in that the physiological information sensor 4i is connected to the connection port CH5 of the branching unit 3c.

As shown in FIG. 13, after the physiological information sensor 4a is detached from the connection port CH1 of the branching unit 3b, the physiological information sensor 4i is newly connected to the connection port CH5 of the branching unit 3c. Thereafter, IN transaction and OUT transaction of the physiological information sensor 4i are executed. In other words, the physiological information data is transferred from the physiological information sensor 4i to the processing device 2, and the control data is transferred from the processing device 2 to the physiological information sensor 4i. Here, as shown in FIG. 14, "9 IN" indicates IN transaction of the physiological information sensor 4i. "9 OUT" indicates OUT transaction of the physiological information sensor 4i.

As shown in FIG. 14, when the physiological information sensor 4a is detached from the branching unit 3b (i.e., when communication between the physiological information sensor 4a and the processing device 2 is disconnected), the transaction of the physiological information sensor 4a is not executed in the subframes f1 and f5. Thereafter, when the physiological information sensor 4i is newly connected to the connection port CH5 of the branching unit 3c, the transaction of the physiological information sensor 4i is executed in the subframes f1 and f5. Specifically, in a time domain in which the transaction of the physiological information sensor 4a is executed, the transaction of the physiological information sensor 4i is executed. Also, in this state, the sequence of the subframes allocated to the transactions of the physiological information sensors 4b to 4h (i.e., each physiological information data of the physiological information sensors 4b to 4h) is maintained.

In this way, even in a case in which the physiological information sensor 4a is detached from the branching unit 3b and the physiological information sensor 4i is newly connected to the branching unit 3c, the processing device 2 can periodically receive the physiological information data from each of the physiological information sensors 4b to 4h and also periodically receive the physiological information data from the physiological information sensor 4i. In this way, it is possible to improve the real time processing for each of the received physiological information data while maintaining the periodicity of the processing for each of the received physiological information data.

Although the exemplary embodiments of the presently disclosed subject matter have been described, the technical scope of the presently disclosed subject matter should not be construed as being limited to the exemplary embodiments. The exemplary embodiments are merely exemplary, and diverse changes of the exemplary embodiments can be made within the scope of the claims by one skilled in the art. The technical scope of the presently disclosed subject matter should be determined by the scope of the claims and equivalents thereto.

Also, in the exemplary embodiments, the plurality of physiological information sensors 4 is connected to the processing device 2 by using the USB interface, which is a communication interface of the digital data. However, the exemplary embodiments are not limited thereto. For example, instead of the USB interface, an Ethernet (registered trademark) interface may be used.

What is claimed is:

1. A physiological information processing apparatus to be communicatively connected to a plurality of physiological information sensors each of which being configured to acquire physiological information data of a subject being tested, the physiological information processing apparatus being configured to:
receive first physiological information data from a first physiological information sensor of the plurality of physiological information sensors, in an $x^{th}$ first subframe (x: natural number) of a plurality of first subframes divided from an $n^{th}$ main frame (n: natural number); and
receive the first physiological information data from the first physiological information sensor, in an $x^{th}$ second subframe of a plurality of second subframes divided from an $m^{th}$ main frame (m: natural number),
wherein at least one first subframe of the plurality of first subframes does not include the first physiological information data,
wherein at least one second subframe of the plurality of second subframes does not include the first physiological information data, and
wherein each of the plurality of first subframes and each of the plurality of second subframes include the physiological information data from one or more physiological information sensors of the plurality of physiological information sensors.

2. The physiological information processing apparatus according to claim 1, wherein the physiological information processing apparatus is configured to:
receive second physiological information data from a second physiological information sensor of the plurality of physiological information sensors, in a $y^{th}$ first subframe (y: natural number); and
receive the second physiological information data from the second physiological information sensor, in a $y^{th}$ second subframe.

3. The physiological information processing apparatus according to claim 2, wherein the physiological information processing apparatus is configured to transmit data which designates the second physiological information sensor, toward each of the plurality of physiological information sensors, in the $y^{th}$ first subframe and the $y^{th}$ second subframe.

4. The physiological information processing apparatus according to claim 1, wherein the physiological information processing apparatus is configured to transmit data which designates the first physiological information sensor, toward each of the plurality of physiological information sensors, in the $x^{th}$ first subframe and the $x^{th}$ second subframe.

5. The physiological information processing apparatus according to claim 1, wherein the physiological information processing apparatus is configured to receive second physiological information data from a second physiological information sensor, in the $x^{th}$ first subframe.

6. The physiological information processing apparatus according to claim 1, wherein the physiological information processing apparatus is configured to transmit control data for controlling the first physiological information sensor to the first physiological information sensor, in a $z^{th}$ first subframe (z: natural number).

7. The physiological information processing apparatus according to claim 1, wherein the physiological information processing apparatus is configured to receive the first physiological information data from the first physiological information sensor, in an $r^{th}$ first subframe (r: natural number).

8. The physiological information processing apparatus according to claim 1, wherein the physiological information processing apparatus is configured not to request the first physiological information sensor to retransmit the first physiological information data even if there is an error in the first physiological information data.

9. The physiological information processing apparatus according to claim 1, wherein when communication between the first physiological information sensor and the physiological information processing apparatus is disconnected, a sequence of subframes allocated to the physiological information data of each of the plurality of physiological information sensors except the first physiological information sensor is maintained.

10. The physiological information processing apparatus according to claim 1, wherein the main frame has a frame length of 1 ms, and each of the plurality of first subframes and the plurality of second subframes has a frame length of 125 μs.

11. The physiological information processing apparatus according to claim 1, wherein the physiological information processing apparatus is configured to periodically receive physiological information data from each of the plurality of physiological information sensors.

12. The physiological information processing apparatus according to claim 1, wherein the physiological information processing apparatus is configured to receive split bulk data, in each of the plurality of first subframes.

13. The physiological information processing apparatus according to claim 1, wherein the physiological information processing apparatus is configured such that, when a second physiological information sensor is newly connected in communication with the physiological information processing apparatus, the physiological information processing apparatus periodically receives second physiological information data from the second physiological information sensor in a state in which a sequence of subframes allocated to the physiological information data of each of the plurality of physiological information sensors except the second physiological information sensor is maintained.

14. A patient system comprising:
the physiological information processing apparatus according to claim 1; and
a plurality of physiological information sensors each of which is configured to acquire physiological information data of a subject being tested and is communicatively connected to the physiological information processing apparatus.

15. A first physiological information sensor of a plurality of physiological information sensors, each of the plurality of physiological information sensors being configured to acquire physiological information data of a subject being tested and to be communicatively connected to a physiological information processing apparatus, the first physiological information sensor being configured to:
transmit first physiological information data to the physiological information processing apparatus, in an $x^{th}$ first subframe (x: natural number) of a plurality of first subframes divided from an $n^{th}$ main frame (n: natural number); and
transmit the first physiological information data to the physiological information processing apparatus, in an $x^{th}$ second subframe of a plurality of second subframes divided from an $m^{th}$ main frame (m: natural number), wherein at least one first subframe of the plurality of first subframes does not include the first physiological information data, wherein at least one second subframe of the plurality of second subframes does not include the first physiological information data, and wherein each of the plurality of first subframes and each of the plurality of second subframes include the physiological information data from one or more physiological information sensors of the plurality of physiological information sensors.

16. A physiological information processing apparatus to be communicatively connected to a plurality of physiological information sensors each of which being configured to acquire physiological information data of a subject being tested, the physiological information processing apparatus being configured to:

receive first physiological information data from a first physiological information sensor of the plurality of physiological information sensors, in an $x^{th}$ first subframe (x: natural number) of a plurality of first subframes divided from an $n^{th}$ main frame (n: natural number), and receive the first physiological information data from the first physiological information sensor, in a $y^{th}$ second subframe of a plurality of second subframes divided from an $m^{th}$ main frame (m: natural number), wherein y is determined based on x, wherein at least one first subframe of the plurality of first subframes does not include the first physiological information data, wherein at least one second subframe of the plurality of second subframes does not include the first physiological information data, and wherein each of the plurality of first subframes and each of the plurality of second subframes include the physiological information data from one or more physiological information sensors of the plurality of physiological information sensors.

* * * * *